(12) United States Patent
Edmunds (10) Patent No.: US 6,441,869 B1
(45) Date of Patent: Aug. 27, 2002

(54) SYSTEMS AND METHODS FOR COLOR SPECIFIC HUE CONTROL

(75) Inventor: Cyril G. Edmunds, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/384,211

(22) Filed: Aug. 27, 1999

(51) Int. Cl.⁷ .................................................. H04N 9/64
(52) U.S. Cl. ........................ 348/651; 348/577; 345/594; 358/518
(58) Field of Search ................................ 348/649–654, 348/577; 345/599–604; 358/518–523; 382/167

(56) References Cited

U.S. PATENT DOCUMENTS

| | | | | |
|---|---|---|---|---|
| 4,782,384 A | * | 11/1988 | Tucker et al. .................. | 358/22 |
| 4,954,881 A | * | 9/1990 | Kaye ........................... | 358/22 |
| 4,954,883 A | * | 9/1990 | Belmaris-Sarabia et al. .. | 358/22 |
| 5,305,094 A | * | 4/1994 | Belmaris-Sarabia et al. ..... | 348/651 |
| 5,311,212 A | | 5/1994 | Beretta | |
| 5,334,992 A | * | 8/1994 | Rochat et al. ................. | 345/22 |
| 5,416,890 A | * | 5/1995 | Beretta ........................ | 395/131 |
| H1506 H | | 12/1995 | Beretta | |
| 5,539,540 A | * | 7/1996 | Spaulding et al. ........... | 358/518 |
| 5,574,666 A | * | 11/1996 | Ruetz et al. ................. | 364/526 |
| 5,933,256 A | * | 8/1999 | Ebner .......................... | 358/520 |
| 5,949,967 A | * | 9/1999 | Spaulding et al. ........... | 395/109 |
| 5,953,499 A | | 9/1999 | Narendranath et al. | |
| 6,058,207 A | * | 5/2000 | Tuijn et al. .................. | 382/162 |
| 6,266,165 B1 | * | 7/2001 | Huang et al. ................ | 358/520 |
| 6,269,184 B1 | * | 7/2001 | Spaulding et al. ........... | 382/167 |
| 6,337,692 B1 | * | 1/2002 | Rai et al. ..................... | 345/594 |
| 6,342,951 B1 | | 1/2002 | Eschbach et al. | |

* cited by examiner

Primary Examiner—Victor R. Kostak
(74) Attorney, Agent, or Firm—Oliff & Berridge, PLC (57) ABSTRACT

Image systems and methods adjust hue angles of one or more colors in an image. The adjusted image may be output to a printer for printing. An image quality control is provided to allow a user to select one or more specific colors whose rendition is unacceptable. Each color may be tested to see if that color is outside the range of colors which can be printed accurately or acceptably on the target printer. If the selected color is outside the range of printable colors, a variety of alternatives can be offered to arrive at the best possible rendition. Otherwise, a variety of hue shifts can be offered, where each hue shift alters the rendition of only those colors having hue angles that are near the offensive color.

34 Claims, 8 Drawing Sheets

SYSTEMS AND METHODS FOR COLOR SPECIFIC HUE CONTROL

BACKGROUND OF THE INVENTION

1. Field of Invention

This invention relates to systems and methods for controlling specific hues in a color image to adjust selected hues.

2. Description of Related Art

The digital reproduction, transfer or display of various images presently occurs using a variety of devices and systems in a variety of environments. The image may be input into a device, processed in some manner, and then output from the device using a printing technique, for example. In some applications, it may be necessary or desirable to convert the image between the input and the output of one device for the specific purpose of using the converted image data by another device. In other applications, it may be necessary or desirable to convert the input image for some particular application within a device itself. In some applications, it may be desirable or necessary to adjust one or more of the hues in an image.

Various hue adjustment techniques are known. These hue adjustment techniques adjust various colors in various imaging devices. The color adjustment processes performed in such equipment may be analog or digital in nature. U.S. Pat. No. 5,305,094 discloses one such color corrector. The apparatus disclosed in the 094 patent is provided with controls for an operator to select, using a window, one color out of many colors. The group of hues among which a selection can be made advantageously includes the three primary and the three secondary colors.

Moreover, the 094 patent discloses that a separate window can be provided for each of those six colors. Together with a separate window for the narrow-band circuit, a total of at least seven windows can be formed and used in a given picture. The selected color can be adjusted inside the window, and a different color can be adjusted outside of the window. All other hues remain unaffected by a window dedicated to one hue. As a result, the other colors can be color-corrected simultaneously with the selected color in all parts of the picture.

Further, U.S. Pat. No. 5,731,818 describes a method for gamut clipping of an image based on user-defined constraints on lightness and hue. The method disclosed in the 818 patent is performed by defining a color gamut surface of an output device using a gamut descriptor and specifying a search range based on maximum tolerances for lightness and hue changes. The 818 patent describes that, for each input color data point outside the gamut, the data point is mapped to the closest point in a portion of the gamut surface specified by the search range.

Figure 1:
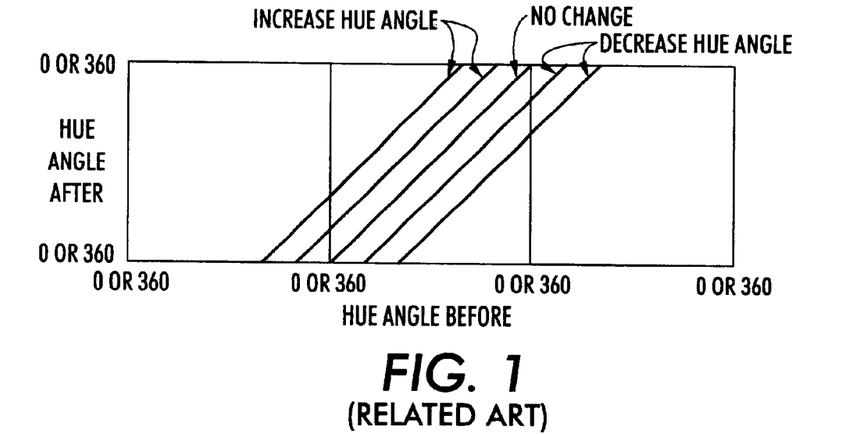
FIG. 1 is a graph showing the shift of hue angles in accordance with conventional techniques.

FIG. 1 further illustrates other known hue adjustment processes. As shown in FIG. 1, the "no change" line represents the before and after hue angles of an original image. Using conventional techniques, a user may vary the original hue angle for every color in the original image to avoid one or more offensive colors. Specifically, the user may either increase the hue angle, or alternatively, decrease the hue angle, for every color appearing in the image, as shown in FIG. 1.

SUMMARY OF THE INVENTION

However, a problem with these known hue adjustment devices is that such devices do not allow an undesirable hue in an image to be easily identified and effectively modified by a user. More specifically, the known hue adjustment devices do not allow an operator to easily identify a problem color and modify only that problem color, along with a limited number of other colors closely surrounding the problem color.

Additionally, a further problem arises since a particular device, such as a printer, is capable of producing a set gamut of hues. However, the known hue adjustment devices do not allow a user to take this color gamut into account, in conjunction with effectively eliminating problem colors.

Accordingly, this invention provides systems and methods that more specifically adjust a selected hue in an image.

This invention separately provides systems and methods that selectively control the hue angle in a color image to effectively control undesirable or unproduceable hues by performing hue shifts that alter the rendition of only those colors that have hue angles near the offensive color.

This invention separately provides systems and methods that adjust the hue of a problem color while leaving unchanged the hue of colors distant from the problem color.

This invention separately provides systems and methods that adjust hue in an image while taking into account the color gamut of the device on which the image will be displayed or reproduced.

This invention separately provides systems and methods that provide hue adjustments using relatively simple and inexpensive adjustment techniques.

This invention separately provides systems and methods that provide a hue control that permits greater flexibility and utility.

Various exemplary embodiments of systems and methods of the invention provide an image quality control to selectively alter the color in an image. The systems and methods of the invention may be used in any of a wide variety of devices, including a color copier or scanner, for example. The image to be reproduced or printed is displayed so that the user can observe the image. Based on this observation, the user selects a specific color of the image that is offensive or in some way unacceptable. Illustratively, the selection process may be performed by positioning a cursor on the color of the image that is offensive.

In accordance with the systems and methods of the invention, the hues resulting from the adjustments may be tested to see if the hues are outside the range of colors that can be printed accurately on a target print engine. If the image is outside the range of colors, various alternatives can be offered to arrive at the best possible rendition of the image. Alternatively, a hue shift or a variety of hue shifts can be generated that alter the rendition of only those colors having hue angles near the offensive color.

These and other features and advantages of this invention are described in or are apparent from the following detailed description of the exemplary embodiments.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 2:
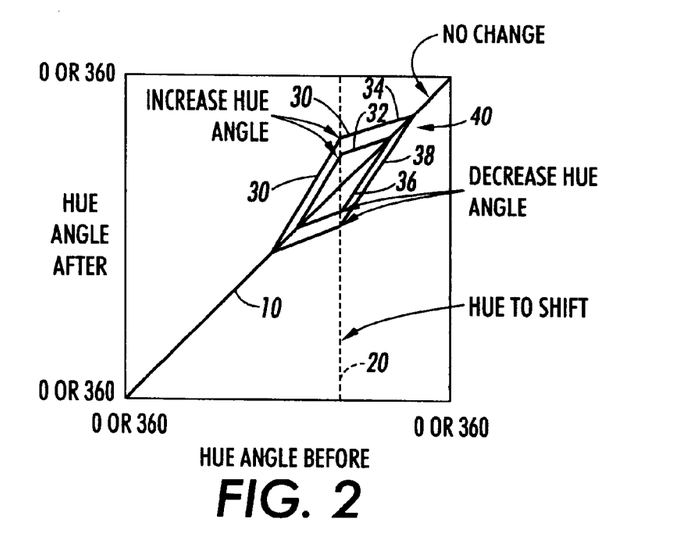
FIG. 2 is a graph showing the shift of hue angles in accordance with the systems and methods of the invention.

The systems and methods of the invention allow a user to modify a problem color, along with other colors surrounding the problem color, while avoiding altering the hue angles of other acceptable colors. FIG. 2 is a graph showing the shift of hue angles in accordance with the systems and methods of the invention. Specifically, the line 10 in FIG. 2 represents the unshifted hue angles of all that colors in an observed image. As shown in FIG. 2, a particular hue angle 20 may be adjusted by a user. The adjustment results in a shift of the hue of that color. In addition, not only the particular hue angle 20 selected by the user shifts, but hue angles 30 adjacent the selected hue angle 20 are also adjusted. In other words, the systems and methods of the invention transform a range of adjacent hue angles 30 in the neighborhood of the selected hue angle 20. That is, a window 40 of hue angles 30 is adjusted about the selected hue angle 20.

However, the systems and methods of the invention do not change hues in the image outside this window. Thus, only the offensive color and the hues around the offensive color are changed in accordance with the systems and methods of the invention. As a result, the user may easily select and eliminate the offensive hue, while avoiding altering the hue angles of acceptable colors. Further, the systems and methods of the invention are not limited to eliminating only one offensive color. Rather, a number of offensive colors may be eliminated. This can be accomplished by using an appropriate user interface.

As shown in FIG. 2, the hue angles 20 and 30 in the window 40 are adjusted. Further, it should be recognized that the hue angle 20 is adjusted to a greater extent than the adjacent hue angles 30. The extent of the adjustment of the hue angles 30 varies from the most adjusted, directly adjacent to the hue angle 20, to the least adjusted, at the respective edges of the window 40, i.e., the left and right edges as shown. As a result, the adjustment to hue angle 20 is accomplished while maintaining a smooth transition between the adjusted hue angles and the unadjusted hue angles, i.e., the unadjusted hue angles outside the window 40.

Further, as illustrated in FIG. 2, the magnitude of the adjustment of the hue angles may be varied. That is, a group of hue angles 32 is adjusted a lesser extent than the group of hue angles 34. Further, a group of hue angles 36 is adjusted a lesser extent than the group of hue angles 38.

Further, as shown in FIG. 2, it should be recognized that in accordance with the systems and methods of the invention, hue angles in an image may be increased or decreased to accomplish an appropriate adjustment. For example, the hue angles 32 and 34 are increased relative to the original hue angles. Alternatively, for example, the hue angles 36 and 38 are decreased relative to the original hue angles.

It should be recognized that the manner of adjusting the hue angles in the window may be varied. To explain, as shown in FIG. 2, the group of the adjusted hue angles 32 generate a slope. The slope of the hue angles 32 is greater than the slope of the adjusted hue angles 34. Further, a first derivative of each of the slopes 32 and 34 is a constant, since the slopes do not vary. However, the systems and methods of the invention are not limited to a non-varying slope. Accordingly, rather than the straight line slope 34, for example, the slope may be curved such that the first derivative is non-constant. It should be appreciated that such a curved slope of adjusted hue angles may generate a smoother transition between adjusted hue angles and hue angles that are not adjusted, which may be desirable in some applications.

Figure 3:
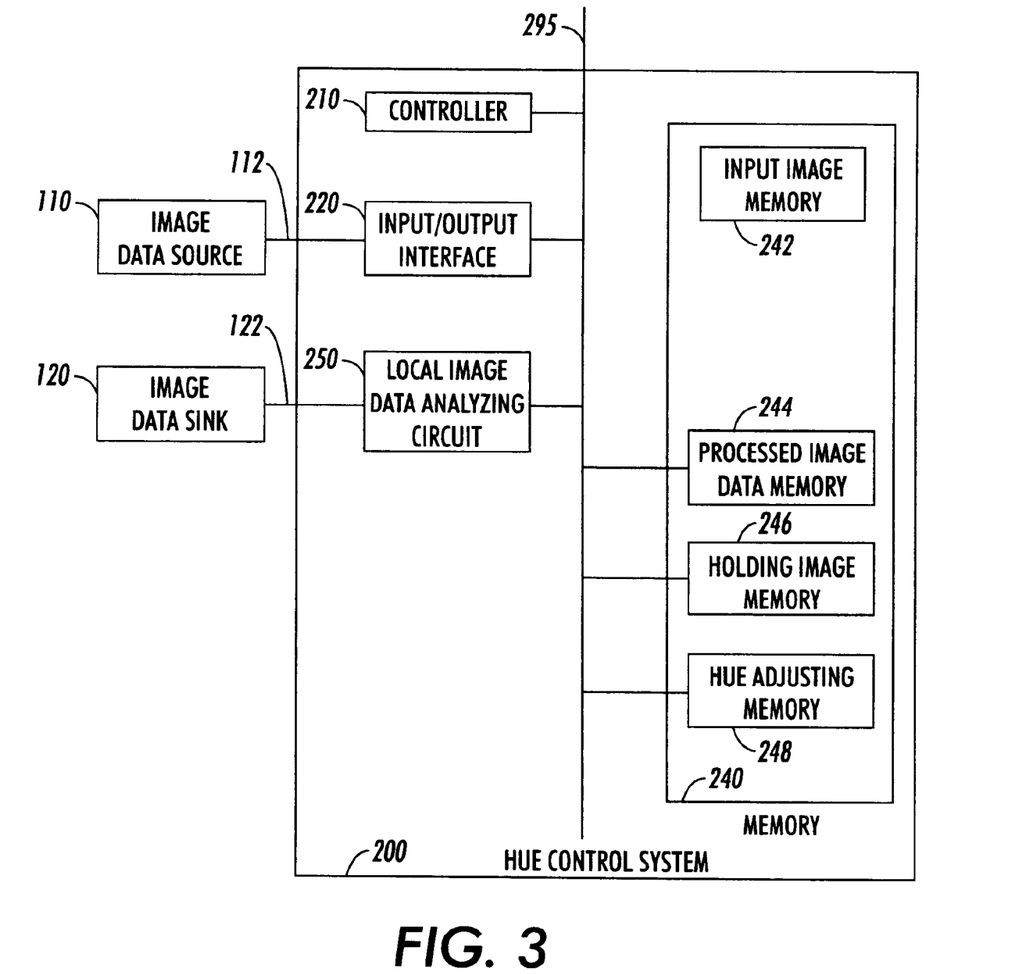
FIG. 3 is a functional block diagram of one exemplary embodiment of a hue control system in accordance with the systems and methods of the invention.

FIG. 3 shows one exemplary embodiment of a generalized functional block diagram of a hue control system 200 according to this invention. The hue control system 200 is connected to an image data source 110 over a signal line or link 112 and to an image data sink 120 over a signal line or link 122. The image data source 110 may be used to provide a wide variety of image data to the hue control system 200. The image data sink 120 receives processed images output by the hue control system 200. The received images may then be printed, for example, on any of a wide variety of devices.

In general, the image data source 110 can be any one of a number of different sources, such as a personal computer, a scanner, a digital copier, a facsimile device that is suitable for generating electronic image data, or a device suitable for storing and/or transmitting electronic image data, such as a client or server of a distributed network, an intranet, an extranet, or the Internet, and especially the World Wide Web. For example, the image data source 110 may be a scanner, or a data carrier such as a magnetic storage disk, CD-ROM or the like, or a host computer, that contains scanned image data.

The image data sink 120 can be any known structural apparatus for indefinitely storing the image data, such as a RAM, a hard drive and disk, a floppy drive and disk, an optical drive and disk, a flash memory, or the like. The image data sink 120 can alternatively be any known device for displaying or rendering an image. Thus, the image data sink 120 can be a CRT, an active or passive matrix LCD, an active or passive LED display, a laser printer, an ink jet printer, a digital copier, or the like.

Thus, the image data source 110 can be any known or later developed source that is capable of providing image data to the hue control system 200 of this invention. Further, the image data source 110 does not necessarily have to be a single device, but rather may be formed by two or more separate devices. Similarly, the image data sink 120 can be any known or later developed device that is capable of receiving the processed image data output by the hue control system 200 and either storing, transmitting, printing and/or displaying that processed image data.

The link 112 can be any known or later developed device or system for connecting the image data source 110 to the hue control system 200, including a direct cable connection, a connection over the public switched telephone network, a connection over a wide area network or a local area network, a connection over an intranet, a connection over the Internet, or a connection over any other distributed processing network or system. In general, the link 112 can be any known or later developed connection system or structure usable to connect the image data source 110 to the hue control system 200. The link 122 can be any known structure or apparatus, such as those described above, for transmitting the image data from the hue control system 200 to a physically remote storage device or display device, such as a printer.

Alternatively, the hue control system 200 can be integrated with either or both of the image data source 110 and the image data sink 120. For example, the image data source 110 can be a scanner of a digital photocopier, while the image data sink 120 is an image output terminal of the digital copier.

As shown in FIG. 3, the hue control system 200 includes a controller 210, an input/output interface 220, a hue angle analyzing circuit 250 and a memory 240, each of which is connected to a data bus 295. The input/output interface 220 is also connectable to the image data source 110 and the image data sink 120 over the signal lines or links 112 and 122, respectively.

As shown in FIG. 3, the memory 240 includes an input image memory 242, a processed image data memory 244, a holding image memory 246, and a hue adjustment memory 248. The input image memory 242 temporarily stores image data, prior to processing, that has been input into the hue control system 200. The processed image data memory 244 temporally stores processed image data that has been processed by the hue control system 200 prior to outputting the processed image. The holding image memory 246 stores image data on a long term basis either before or after processing. The image data may be input from the image data source 110 through the input/output interface 220, or, alternatively, may result from retrieving an image previously stored in the hue control system 200. The hue adjustment memory 248 stores appropriate information for transforming an image or a portion of an image that possesses offensive hue color. This information may be implemented as a look-up table or may be implemented as a set of equations, for example. Alternatively, the information may be implemented using Boolean logic.

As described herein, the term "offensive" is intended to encompass one or more particular hues that the user believes to be desirable or necessary to eliminate from the image. A user may want to eliminate the offensive hue for any of a wide variety of reasons. For example, a particular problem may be associated with the rendition of a certain hue. Illustratively, a user may want to eliminate a particular hue simply because it is visually unattractive. Alternatively, a user may want to eliminate a particular hue because it is not reproducible on a particular target printer.

The memory 240 also stores any necessary control programs and/or data required by the hue control system 200. Thus, the memory 240 can be implemented using static or dynamic RAM, a floppy disk and disk drive, a writable optical disk and disk drive, a hard disk and disk drive, flash memory, or the like. The memory 240 can also include read only memory, including PROMs, EPROMs, EEPROMs, a CD-ROM and disk drive, or the like.

Figure 4:
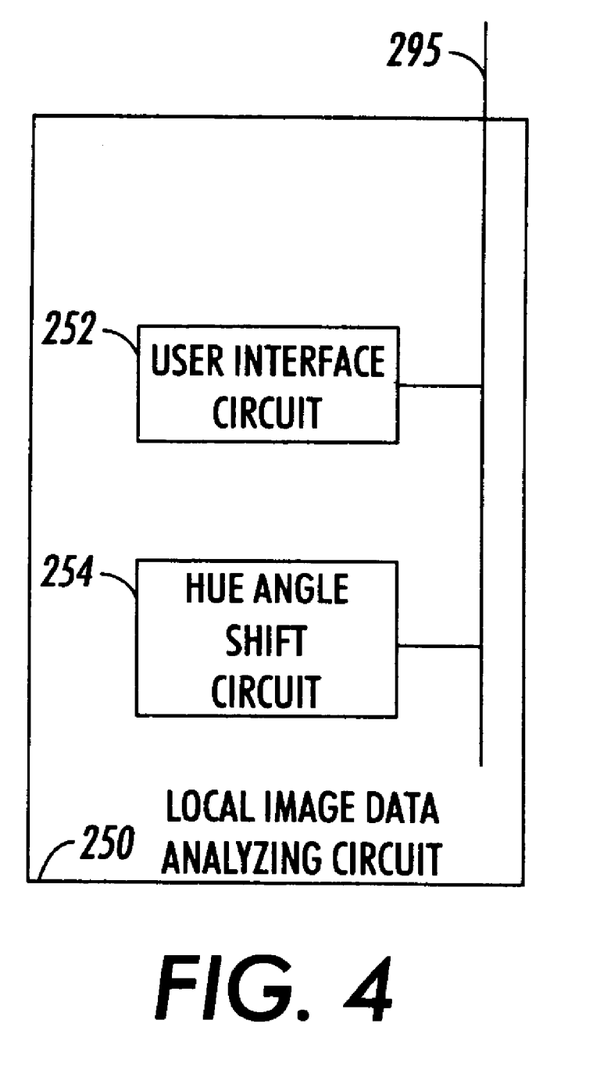
FIG. 4 shows in greater detail one exemplary embodiment of a functional block diagram of the hue angle analyzing circuit of FIG. 3 in accordance with the systems and methods of the invention.

FIG. 4 shows in greater detail one exemplary embodiment of a functional block diagram of the hue angle analyzing circuit 250. As shown in FIG. 4, the hue angle analyzing circuit 250 includes a user interface circuit 252 and a hue angle shift circuit 254. The user interface circuit 252 displays one or more graphical user interfaces on a display device, for example. The user interface circuit 252 also accepts user input received through the input/output interface 220 and performs certain operations in response to that user input. The hue angle shift circuit 254 uses various pieces of information to generate a modified image possessing adjusted hue angles for one or more colors.

The hue control system 200 shown in FIGS. 3 and 4 is, in one exemplary embodiment, implemented on a programmed general purpose computer. However, the hue control system 200 shown in FIGS. 3 and 4 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 9, can be used to implement the hue control system 200.

In particular, it should be understood that each of the circuits shown in FIGS. 3 and 4 can be implemented as portions of a suitably programmed general purpose computer. Alternatively, each of the circuits shown in FIGS. 3 and 4 can be implemented as physically distinct hardware circuits within an ASIC, or using a FPGA, a PDL, a PLA or a PAL, or using discrete logic elements or discrete circuit elements. The particular form each of the circuits shown in FIGS. 3 and 4 will take is a design choice and will be obvious and predicable to those skilled in the art.

The memory 240 is preferably implemented using static or dynamic RAM. However, the memory 240 can also be implemented using a floppy disk and disk drive, a writable optical disk and disk drive, a hard drive, flash memory or any other known or later developed alterable volatile or non-volatile memory device or system.

In accordance with the systems and methods of the invention, the hue control system 200 may be used by a user to shift or vary an offensive hue in an image. Illustratively, one exemplary problem addressable by the hue control system 200 is the "green face syndrome". To explain, a hue may be present in an image that cannot be accepted by a particular device, for example, a printer. Alternatively, a color in a displayed image may be unpleasant to an observer, i.e., a green face. Under such circumstances, various aspects and parameters of the image may be compromised, so long as the offensive color is suitably modified. The systems and methods according to this invention provide a user with the ability to appropriately modify an image having an offensive hue without having to modify the hue angle of every color in the hue image.

In accordance with the systems and methods of the invention, the user observes a displayed image. In accordance with one exemplary embodiment of the systems and methods of the invention, the user visually determines that the image contains an offensive color. As a result, the user inputs a command to the computer using any known or later developed input device, such as a mouse. The command by the user provides input to the computer that the user wishes to perform adjustments to the displayed image. Illustratively, a pull down graphical user interface may include a document services sub-menu, which the user may select.

Once the user selects the document services submenu, the user interface circuit 252 initializes a programmed routine.

Figure 5:
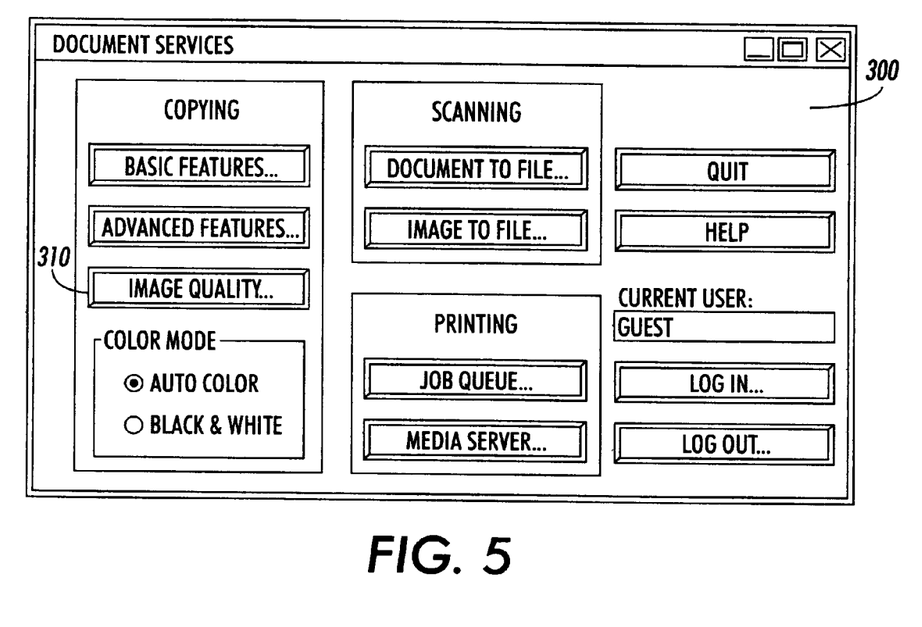
FIG. 5 is a graphical user interface showing an image quality feature in accordance with the systems and methods of the invention.

In one exemplary embodiment, the user interface circuit 252 initially displays a job selection graphical user interface 300, such as that shown in FIG. 5.

As shown in FIG. 5, the job selection graphical user interface 300 includes a variety of options, including copying options, scanning options, printing options and log in/log out options, for example. Under the copying options, the job selection graphical user interface 300 includes an image quality button 310. If the user wants to adjust the hue of one or more colors of the displayed image, the user selects the image quality button 310. Once the user interface circuit 252 determines that the image quality button 310 has been selected, the user interface circuit 252 then displays an image quality adjustment graphical user interface 400.

Figure 6:
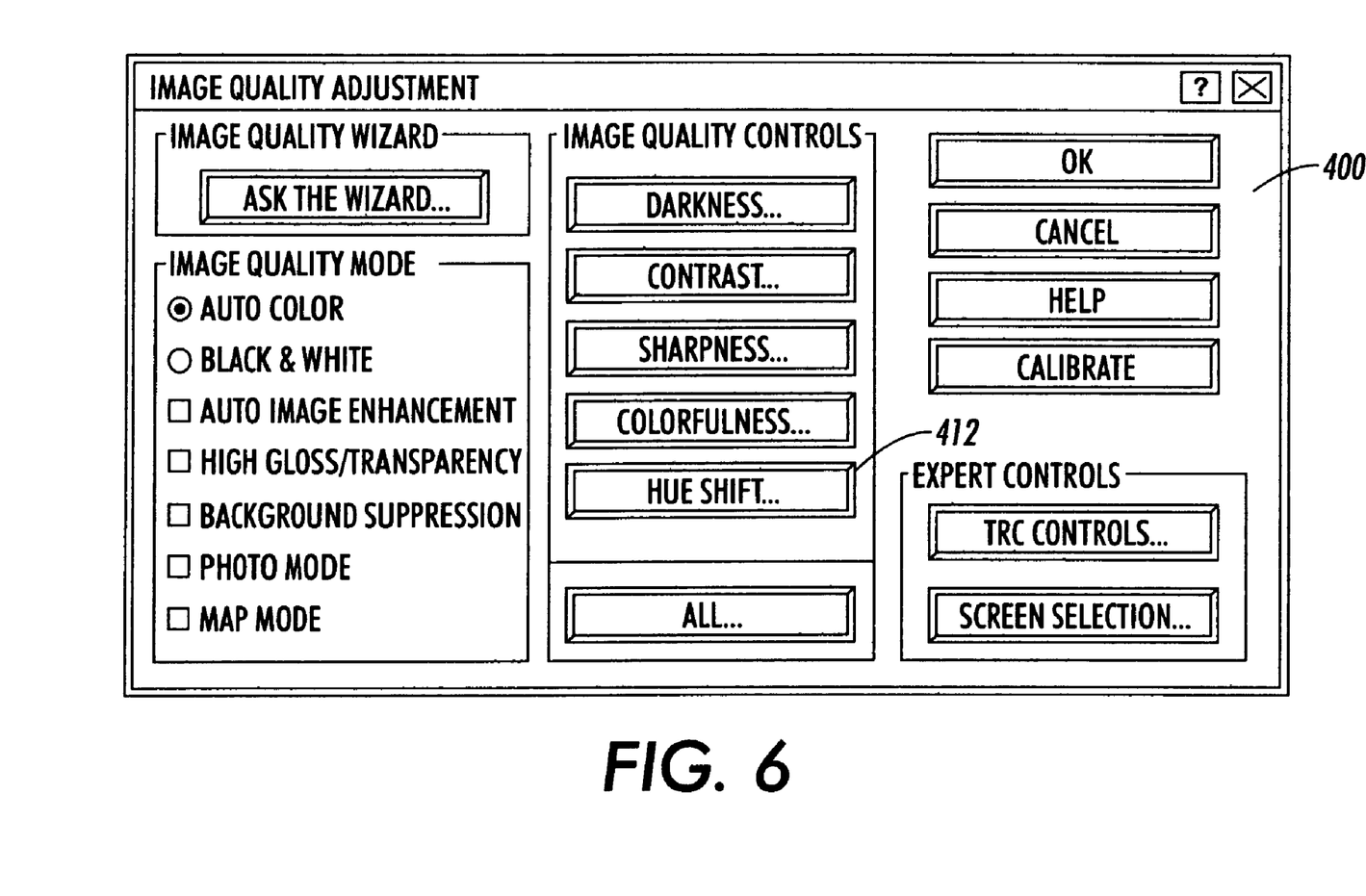
FIG. 6 is a graphical user interface showing a hue shift feature in accordance with the systems and methods of the invention.

As shown in FIG. 6, the image quality adjustment graphical user interface 400 includes a variety of control functions including image quality modes, image quality controls and expert controls, for example. In accordance with one exemplary embodiment of the systems and methods of the invention, the user then selects the hue shift button 412 located in the image quality adjustment graphical user interface 400. Once the user interface circuit 252 detects that the hue shift button 412 has been selected, the user interface circuit 252 displays the image to be adjusted so that the color, whose hue is to be adjusted, can be selected.

Figure 7:
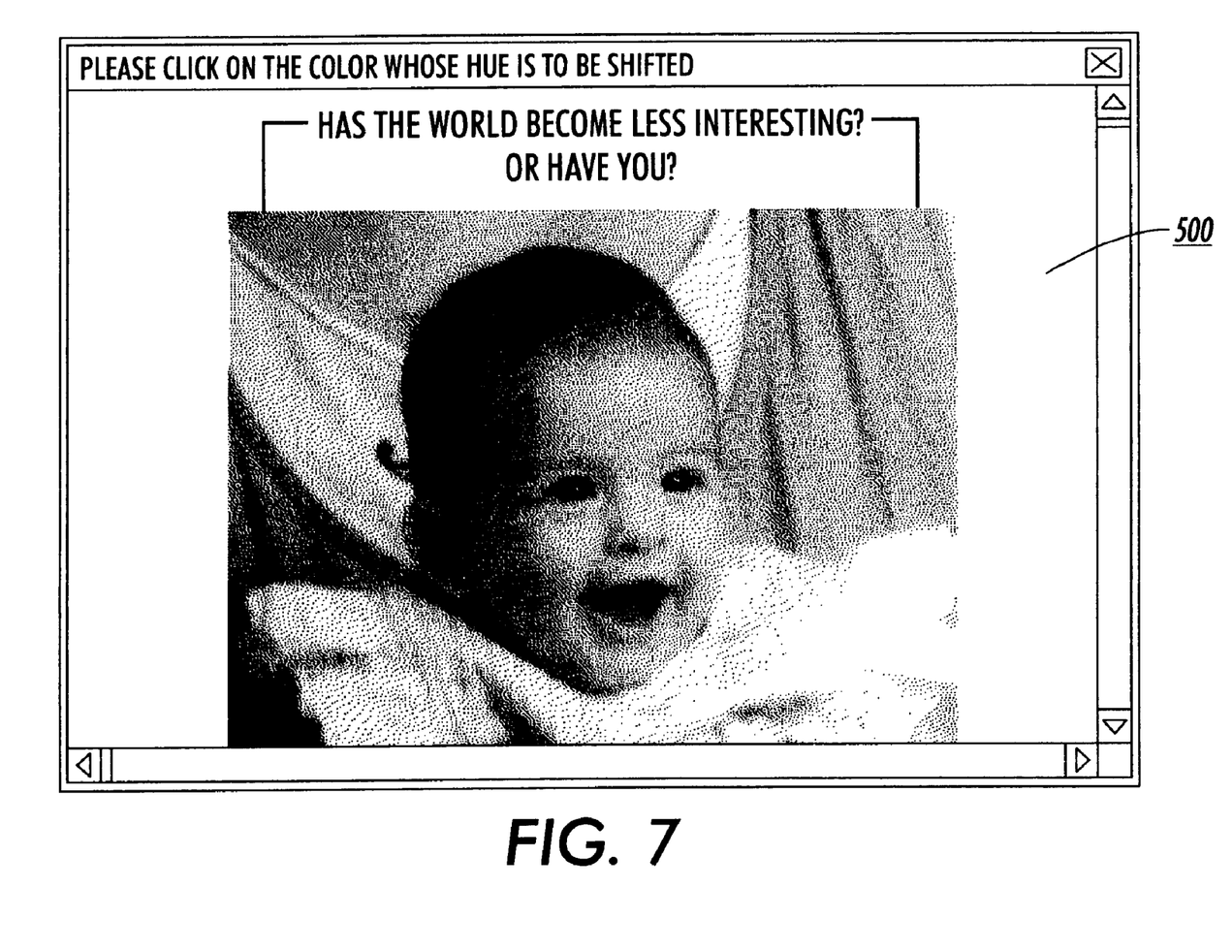
FIG. 7 is an image which possesses offensive colors and which may be adjusted in accordance with the systems and methods of the invention.

FIG. 7 shows one exemplary image 500 having a color whose hue is to be adjusted. The user interface circuit 252, in response to the hue shift button 412 being selected, displays the image 500. According to this example, the image 500 that is initially displayed by the user interface circuit 252 is identical to the original image displayed prior to the hue shift routine being started.

Also, the user interface circuit 252 displays appropriate text to instruct the user of the next step to be performed. As shown in FIG. 7, the user interface circuit 252 displays, for example, the instruction "Please click on the color whose hue is to be shifted." Accordingly, the image 500 works as a graphical user interface. That is, the image 500 acts as a graphical user interface that allows a user to easily and efficiently select the specific color or colors of the image 500 to be adjusted.

Figure 8:
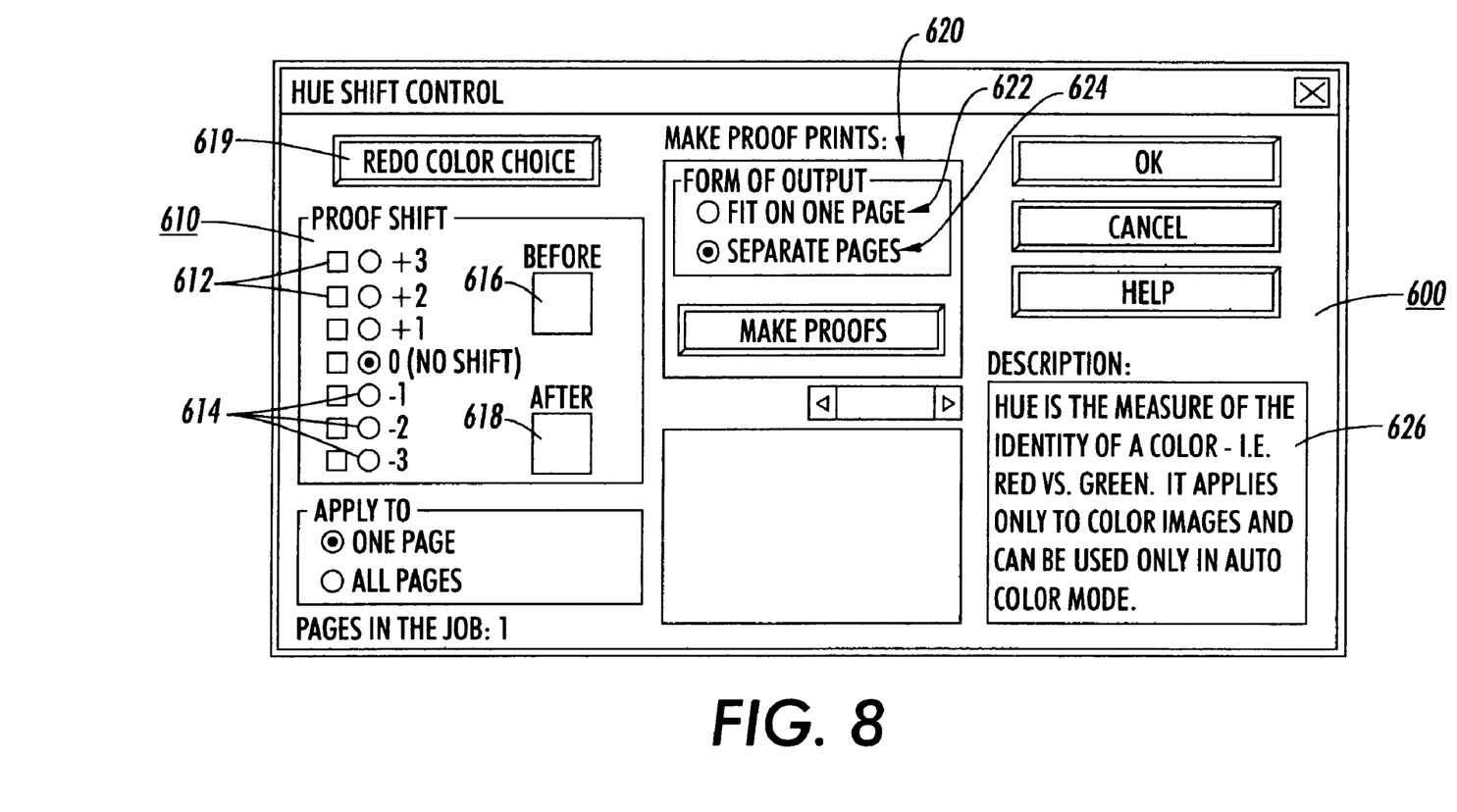
FIG. 8 is a graphical user interface providing controls for varying the hue angle in an image in accordance with the systems and methods of the invention.

In response to display of the image to be adjusted, the user observes the image to determine and locate one or more offensive colors. Once the one or more offensive colors are determined, the user clicks on each offensive color in the image. In response, as shown in FIG. 8, the user interface circuit 252 displays a hue shift control graphical user interface 600. The hue shift control graphical user interface 600 contains a variety of options for the user. Options relating to performing a hue shift are located in a hue shift portion 610. The hue shift control graphical user interface 600 also contains a make proof prints portion 620, which is discussed in further detail below.

Specifically, the hue shift portion 610 includes a plurality of buttons arranged in two columns. The buttons include proof check boxes 612 and hue shift radio buttons 614. One or more of the proof check boxes 612 may be selected at any given time. Only one of the hue shift radio buttons 614 may be selected at a time.

The hue shift radio buttons 614 range from –3 to +3. When the user interface circuit 252 initially displays the hue shift control graphical user interface 600, the "0" hue shift radio button 614 is selected. The "0" shift control button indicates that no hue shift is to be performed on the selected color or colors of the image.

The hue shift control graphical user interface 600 may also include additional information to assist the user. As shown in FIG. 8, the hue shift control graphical user interface 600 may display in the text box 626 the text message "Hue is a measure of the identity of a color—i.e., red vs. green. It applies only to color images and can be used only in Auto Color mode."

The hue shift portion 610, contained in the hue shift control graphical user interface 600, also includes a before window 616 and an after window 618. When the hue shift control graphical user interface 600 is initially displayed, the before window 616 and the after window 618 display the color that was selected by the user as being offensive. Further, the before window 616 will continue to display the originally selected color during manipulation of the hue shift radio buttons 614. However, when the user chooses a hue shift radio button 614 other than the "0 (no shift)" button of the hue shift radio buttons 614, the selected hue displayed in the after window 618 will be shifted in accordance with the systems and methods of the invention.

The user interface circuit 252 displays the shifted hue in the after window 618. As a result, the user is provided with a before and after display of the original and adjusted color, respectively. This allows the user to accurately choose the adjusted color. Illustratively, the user may select a positive hue shift radio button 614, as shown in FIG. 8. If the user selects such a positive hue shift radio button 614, then the user increases the hue angle of the color displayed in the after window 618. Alternatively, if the user selects a negative hue shift radio button 614, the user decreases the hue angle of the color displayed in the after window 618. The user may manipulate the hue shift radio buttons 614 until the user has attained a desired adjusted color. By selecting one or more of the various proof check boxes 612, the user can obtain "proof" printouts of the image with the various hue shifts.

Once the user has adjusted the hue angle to the desired degree, the user then clicks on the "OK" button on the hue shift control graphical user interface 600. Once the user interface circuit 252 detects that the OK button has been selected in the hue shift control graphical user interface 600, the user interface circuit 252 displays the adjusted image. Specifically, the user interface circuit 252 uses the selected hue angle shift circuit 254 to adjust the entire original image.

Once the user observes the adjusted image, the user may decide that the adjustment is not appropriate. Then, the user can go back to the hue shift control graphical user interface 600 and click the redo color choice button 619. By selecting the redo color choice button 619, the adjustments to the image will be undone and the user will have an opportunity to again attempt the selection of an appropriate hue.

Further, as described above, the hue shift portion 610 includes a plurality of proof check boxes 612. A user may select any one or all of the proof buttons 612. Also, once a proof check box 612 is checked, the user may select one of the radio buttons in the make proof prints portion 620. Specifically, the user selects the fit on one page option 622 or the separate pages option 624 to fit the selected proof prints onto one page, or separate pages, respectively. Subsequent to selecting one of the proof check boxes 612, the user may then select the OK button in the hue shift control graphical user interface 600.

In response to this OK command, the hue angle shift circuit 254 prints one adjusted image 500 corresponding to each of the selected proof check boxes 612. The proof feature allows the user to compare the different images possessing different adjusted hue angles. If the user selected the fit on one page option 622, then all the proof images will be printed on a single page. The proofs will be sized as is necessary for all the proofs to fit on the single page. Alternatively, if the user selected the separate pages option 624, then only one proof image will be printed on each page. This display mode allows the image to be printed in full scale or greater.

Once the user has determined which image is most desirable, the user provides a command to return to the hue shift control graphical user interface 600. The user may then uncheck all the proof buttons 612 and check the hue shift radio button 614 that corresponds to the most desirable hue angle previously determined.

Further, the systems and methods of the invention are not limited to eliminating only one offensive color. Rather, a number of offensive colors may be eliminated. This may be performed by repeatedly activating the hue shift control graphical user interface 600. Each time the hue shift control graphical user interface 600 is displayed, the user may click on an additional offensive hue to eliminate the offensive hue.

After the hue angle shift circuit 254 performs a hue shift operation, the hue angle shift circuit 254 then displays the image 500 containing the adjusted hues. It should be recognized that in accordance with one embodiment of the systems and methods of the invention, the data representing the entire image does not change as the user manipulates the hue shift radio buttons 614 in the hue shift control graphical user interface 600. Rather, the user interface circuit 252 only manipulates data sufficient to display the adjusted hue in the after window 618. Then, when the OK button is selected to exit from the hue shift control graphical user interface 600, the hue angle shift circuit 254 uses the data obtained by the user, which was input from the hue shift radio buttons 614, and performs the adjustment on the entire image.

Accordingly, in accordance with the systems and methods of the invention, the hue angle shift circuit 254 adjusts a specific hue 20 as shown in FIG. 2. The magnitude of the adjustment is dictated by the user input as controlled by the hue shift radio buttons 614. However, as described above and shown in FIG. 2, not only the adjusted hue 20 is adjusted, but also the adjacent hues 30 around the hue 20 are also adjusted.

The adjacent hues 30 are adjusted using a predefined relationship. This predefied relationship may be an empirically determined relationship or a mathematical relationship. Thus, the adjacent hues 30 may be adjusted using a look-up table, stored in the hue adjustment memory 248, that corresponds to the predefined relationship . The look-up table may be designed to provide appropriate output to generate the adjustments to the hue angles of the adjacent hues 30 surrounding the adjusted hue 10. The look-up table may be designed using statistical optimization techniques or expert knowledge.

Alternatively, the hue adjustment memory 248 may store a system of equations that correspond to the predefined relationship to generate the adjustments to the hue angles of the adjacent hues 20. The system of equations adjust the adjacent hues 30 on opposing sides of the adjusted hue 20, in a certain window about the adjusted hue 20. This system of equations may include one or more equations, and the equations may be linear or non-linear. However, in either case, the curve or curves defined by the system of equations should form, with the unadjusted hue angle line 10, as smooth a total curve as possible. For instance, flat slopes for the linear equations are generally preferred over steep slopes. Similarly, smooth transitions between the unadjusted hue angle line 10 and the lines or non-linear curves are preferred over abrupt transitions.

For example, for linear equations, the system of equations will generally include two linear equations, one linear equation having a predetermined or selected positive slope and one linear equation having a related predetermined or selected negative slope. Each linear equation will pass through the adjusted hue angle and will intercept the unadjusted hue angle line 10 on one side of the selected color to be adjusted.

For non-linear equations, the system of equations could include one equation or could include two or more equations. For example, the system of equations could include a single parabolic or higher order function, a gaussian function, or a single sinusoidal function. In this case, the single parabolic or higher order function, the gaussian function, or the single sinusoidal function, will pass through the adjusted hue angle and will intercept the unadjusted hue angle line 10 on both sides of the selected color to be adjusted. Alternatively, the system of equations could include two (or more) parabolic or higher order functions, two (or more) sinusoidal functions, or one (or more) of each. For two such functions, each such function will pass through the adjusted hue angle and will intercept the unadjusted hue angle line 10 on one side of the selected color to be adjusted.

As described above, when the OK button is selected to exit from the hue shift control graphical user interface 600, the hue angle shift circuit 254 uses the data obtained by the user input from the hue shift radio buttons 614 and performs the adjustment for every adjusted color wherever it appears in the entire image. That is, the hue angle shift circuit 254 determines all the occurrences of the adjusted hue 20 and the adjacent hues 30 in the image and adjusts those hues. After the entire original image is adjusted, the adjusted image may be sent to a printer or stored in the holding image memory 246. With this approach, memory is efficiently used.

Thus, in accordance with the embodiment of the systems and methods of the invention described above, the data representing the entire image does not change as the user manipulates the hue shift radio buttons 614 in the hue shift control graphical user interface 600, as described above. Rather, the user interface circuit 252 only manipulates data sufficient to display the adjusted hue in the after window 618. However, it should be recognized that the systems and methods of the invention are not limited to such technique. Instead, the entire image could be directly adjusted in response to manipulation of the hue shift radio buttons 614. Illustratively, the entire image could be displayed simultaneously with the hue shift control graphical user interface 600. This would allow a user to immediately observe the changes in the displayed image. However, as should be apparent, additional memory would be required to adjust the entire image in such a manner.

As described above, the user selects the offensive color using an input device in accordance with the systems and methods of the invention. It should be recognized that while the specific exemplary embodiment of the systems and methods of the invention described above with respect to FIG. 6 uses hue shift radio buttons 614, the specific controls to vary the hue may be widely varied. Illustratively, a knob control, or increase/decrease buttons, may be used to provide the interface between a computer and the user to vary the hue.

In accordance with another exemplary embodiment of the invention, the hue angle shift circuit 254 also checks the adjusted hues against the color gamut of the target print engine, either before or after the hue of the user-specified color is adjusted, as outlined above. If the selected hue is outside the gamut of the target print engine, the systems and methods of the invention may be provided to offer a variety of alternatives. One alternative is that a different gamut mapping strategy may be offered. An additional alternative is that a hue shift may be offered which results in mapping the color to a more pleasant, although still not accurate, color. Alternatively, if the gamut is acceptable, the hue angle shift circuit 254 performs the hue shift. Thus, the systems and methods of the invention have the advantage of being easily used by an operator since the offensive color can be indicated very simply. Additionally, the systems and methods of the invention introduce minimal side effects and allow problems arising from out of gamut hues to be dealt with effectively.

Accordingly, once a user selects a color that displeases the user, the hue angle shift circuit 254 then checks to see how the color corresponds to the gamut of the target print engine. In particular, the hue angle shift circuit 254 determines if the present hue is within the gamut, at the edge of the gamut, or out of the gamut of the target print engine. The hue angle shift circuit 254 may then provide information to the user regarding whether the hues resulting from the adjustments are within the gamut of the print engine. Accordingly, in accordance with the systems and methods of the invention, a problem hue may not be fixed completely, but may be diagnosed, thus resulting in a best alternative.

Figure 9:
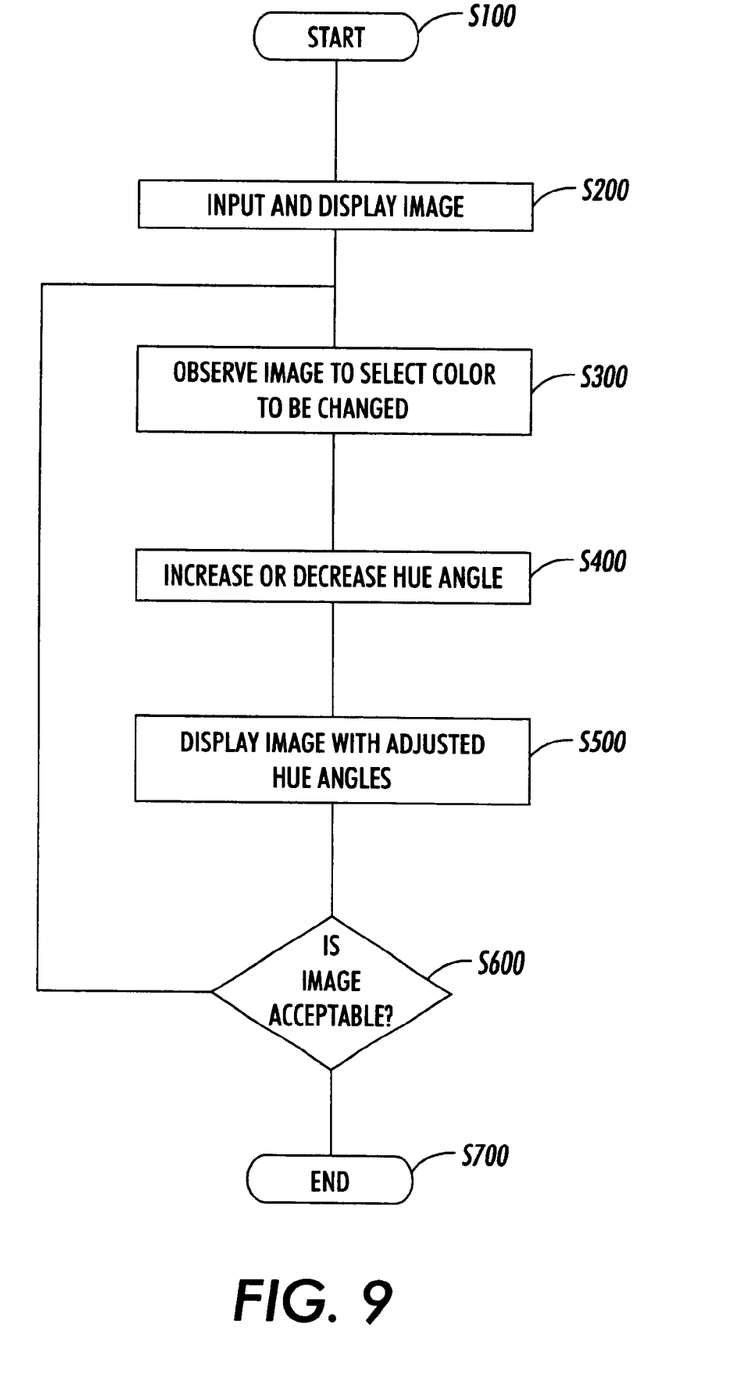
FIG. 9 is a flowchart outlining one exemplary embodiment of a method for changing the hue in an image in accordance with the systems and methods of the invention.

FIG. 9 is a flowchart outlining one exemplary embodiment of a hue adjustment method according to this invention. As shown in FIG. 9, the processing process begins in step S100, and continues to step S200, where an image is input and displayed.

Then, in step S300, the user observes the displayed image and selects a color in the image to be changed. Control then passes to step S400.

In step S400, the hue angle of the selected color is increased or decreased. Then, in step S500, the entire image is displayed with the adjusted hue angles. In step S600, a determination is made whether the displayed image is acceptable. This determination can be made by the user, the determination can be made automatically, or the determination can be made using both automatic determination and user-input information about the acceptability of the adjusted hue angle.

If, in step S600, the image is determined to be acceptable, control continues to step S700. Otherwise, control returns to step S300. In step S700, the process ends.

It should be appreciated that the systems and methods according to the invention are applicable to a wide variety of image processes. The systems and methods in accordance with the invention are illustratively directed to controlling the hue in conjunction with printing the image. However, it should be recognized that images may be generated and manipulated in various ways other than printing in accordance with the systems and methods of the invention. Further, it should be recognized that the systems and methods described herein can be used in conjunction with various other processes and systems.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of adjusting a hue angle of at least one known color in an image, the method comprising:
   selecting a color in the image to be adjusted;
   defining a two-dimensional window of hues that surrounds the selected color wherein one axis of the window is the hue angle before adjustment and a perpendicular axis of the window is the hue angle after adjustment;
   determining a set of colors within the window around the selected color to be adjusted, the set of colors including the selected color and hue angles of a set of colors extending overt a range that is less than 360°;
   adjusting the hue angles of a determined set of colors, including the selected color, within the window, adjusting the hue angles directly adjacent to the selected color to a greater extent than the hue angles less directly adjacent the selected color to achieve a smooth transition between the adjusted hue angles and the unadjusted hue angles outside the window; and
   determining if the adjusted hue angle of at least the selected color is acceptable.

2. The method of claim 1, wherein selecting the color to be adjusted comprises comparing each color appearing in the image to a predetermined color gamut.

3. The method of claim 2, wherein the predetermined color gamut is a color gamut of a device for displaying the image.

4. The method of claim 3, wherein the device for displaying the image comprises at least one of a CRT display, an LCD display, an LED display, a laser printer, an inkjet printer, a digital copier, a dye sublimation printer, or a facsimile machine.

5. The method of claim 1, wherein selecting the color to be adjusted comprises:
   displaying the image to a user, the user observing the displayed image; and
   receiving an input from the user identifying the color to be adjusted.

6. The method of claim 5, wherein receiving the input identifying the color to be adjusted comprises selecting a portion of the displayed image having the color to be adjusted using an input device.

7. The method of claim 1, wherein determining the set of colors around the color to be adjusted comprises:
   determining an amount of adjustment to the hue angle of the selected color; and
   determining the set of colors based on the determined amount of adjustment and a predefined relationship.

8. The method of claim 7, wherein the predefined relationship is stored in a look-up table.

9. The method of claim 7, wherein the predefined relationship is at least one function defining at least one curve extending from the adjusted hue angle of the selected color and intercepting an unadjusted hue angle line on either side of the selected color.

10. The method of claim 9, wherein the at least one function defining the at least one curve is a pair of functions defining a pair of lines having constant slopes.

11. The method of claim 9, wherein the at least one function defining the at least one curve comprises at least one non-linear function.

12. The method of claim 11, wherein the at least one non-linear function is a parabolic or higher order function or a sinusoidal function.

13. The method of claim 11, wherein the at least one non-linear function is a pair of non-linear functions comprising at least one of at least one parabolic or higher order function and at least one of at least one sinusoidal function.

14. The method of claim 7, wherein determining the amount of adjustment to the hue angle of the selected color comprises comparing the selected color to a predetermined color gamut.

15. The method of claim 14, wherein the predetermined color gamut is a color gamut of a device for displaying the image.

16. The method of claim 15, wherein the device for displaying the image comprises at least one of a CRT display, an LCD display, an LED display, a laser printer, an inkjet printer, a digital copier, a dye sublimation printer, or a facsimile machine.

17. The method of claim 7, wherein determining the amount of adjustment to the hue angle of the selected color comprises:

displaying the selected color to a user, the user observing the displayed selected color; and receiving an input from the user identifying the amount of adjustment to the hue angle of the selected color.

18. The method of claim 17, further comprising displaying a set of adjustment amounts to the user, wherein receiving the input identifying the amount of adjustment to the hue angle of the selected color comprises selecting one of the set of adjustment amounts using an input device.

19. The method of claim 1, wherein determining if the adjusted hue angle of at least the selected color is acceptable comprises:

comparing at least the adjusted hue angle to a predetermined color gamut; and determining if each compared hue angle is within the predetermined color gamut.

20. The method of claim 19, wherein the predetermined color gamut is a color gamut of a device for displaying the image.

21. The method of claim 20, wherein the device for displaying the image comprises at least one of a CRT display, an LCD display, an LED display, a laser printer, an inkjet printer, a digital copier, a dye sublimation printer, or a facsimile machine.

22. The method of claim 19, wherein comparing at least the adjusted hue angle to a predetermined color gamut comprises comparing only the adjusted hue angle to the predetermined color gamut.

23. The method of claim 19, wherein comparing at least the adjusted hue angle to a predetermined color gamut comprises comparing, for each adjusted hue angle corresponding to an unadjusted color appearing in the image, that adjusted hue angle to the predetermined color gamut.

24. The method of claim 1, further comprising:

varying the magnitude of the adjustment of the hue angles so that a group of hue angles is adjusted a lesser extent than another group of hue angles.

25. The method of claim 1, wherein the adjustment of hue angles comprises increases and/or decreases in hue angles relative to an original hue angle.

26. The method of claim 1, wherein the adjustment of hue angles in the window may be varied according to a hue angle slope in the window which varies.

27. A system for adjusting a hue angle of a color in an image, the system comprising:

a memory that stores the image;

a window defining device that defines a two-dimensional window of hues that surrounds the selected color wherein one axis of the window is hue angle before adjustment and the perpendicular axis is hue angle after adjustment;

a hue angle analyzing circuit that determines a set of colors within the window around the color selected to be adjusted, wherein the window includes the selected color and hue angles of the set of colors extending over a range that is less than 360°; and a controller that adjusts the hue angles of a determined set of colors, including the selected color, within the window, adjusting the hue angles directly adjacent to the selected color to a greater extent than the hue angles less directly adjacent the selected color to achieve a smooth transition between the adjusted hue angles and the unadjusted hue angles outside the window.

28. The system of claim 27, further comprising an input interface connectable to at least one of an image data source and an image data sink.

29. The system of claim 27, further comprising at least one of an image data source and an image data sink.

30. A digital copier comprising the system of claim 27.

31. The system of claim 27, wherein the hue angle analyzing circuit comprises a circuit that determines if any colors of the image are outside a predetermined color gamut.

32. The system of claims 27, further comprising:

a display device; and an input device;

wherein the hue angle analyzing circuit displays the image on the display and is capable of receiving an input from one of the input device identifying the color to be adjusted.

33. The system of claim 32, wherein the hue analyzing circuit comprises a user interface circuit that displays a graphical user interface on the display, the graphical user interface including the displayed image, each color of the displayed image selectable by the input device to identify the color to be adjusted.

34. The system of claim 32, wherein the hue analyzing circuit comprises a user interface circuit that displays, in response to the input identifying the color to be adjusted, a graphical user interface on the display, the graphical user interface displaying the identified color and allowing an adjustment amount to be specified, the graphical user interface further displaying an adjusted color based on the specified adjustment amount and the identified color.

* * * * *